US012676116B2

(12) United States Patent
Chen et al.

(10) Patent No.: US 12,676,116 B2
(45) Date of Patent: Jul. 7, 2026

(54) ELECTRONIC DEVICE

(71) Applicants: Innolux Corporation, Miaoli County (TW); CARUX TECHNOLOGY PTE. LTD., Singapore (SG)

(72) Inventors: Chung-Le Chen, Miaoli County (TW); Yu-Hsin Feng, Miaoli County (TW); Li-Wei Sung, Tainan (TW); Shuo-Ting Hong, Miaoli County (TW)

(73) Assignees: Innolux Corporation, Miaoli County (TW); CARUX TECHNOLOGY PTE. LTD., Singapore (SG)

( * ) Notice: Subject to any disclaimer, the term of this patent is extended or adjusted under 35 U.S.C. 154(b) by 0 days.

(21) Appl. No.: 18/943,924

(22) Filed: Nov. 12, 2024

(65) Prior Publication Data

US 2025/0182696 A1 Jun. 5, 2025

(30) Foreign Application Priority Data

Dec. 5, 2023 (CN) ......................... 202311656450.1

(51) Int. Cl.
*G09G 3/3258* (2016.01)

(52) U.S. Cl.
CPC ....... *G09G 3/3258* (2013.01); *G09G 2310/08* (2013.01); *G09G 2320/0233* (2013.01)

(58) Field of Classification Search
CPC ............. G09G 3/3233; G09G 2310/08; G09G 2300/0842; G09G 3/3275
See application file for complete search history.

(56) References Cited

U.S. PATENT DOCUMENTS

| | | | | |
|---|---|---|---|---|
| 9,349,317 B2 * | 5/2016 | Kim | ..................... | G09G 3/3233 |
| 11,538,384 B2 * | 12/2022 | Pyun | ..................... | G09G 3/3685 |
| 11,837,178 B2 * | 12/2023 | Kim | ..................... | G09G 3/3291 |
| 2020/0184898 A1 * | 6/2020 | Choi | ..................... | G09G 3/3233 |
| 2020/0193912 A1 * | 6/2020 | Park | ..................... | G09G 3/3275 |
| 2020/0365104 A1 * | 11/2020 | Ahn | ..................... | G09G 3/3225 |
| 2023/0206864 A1 * | 6/2023 | Kim | ..................... | G09G 3/3275 345/214 |
| 2024/0144856 A1 * | 5/2024 | Kim | ..................... | G09G 3/2096 |
| 2025/0209996 A1 * | 6/2025 | Kim | ..................... | G09G 3/3275 |
| 2025/0265972 A1 * | 8/2025 | Lee | ..................... | G09G 3/3275 |
| 2025/0316206 A1 * | 10/2025 | Kim | ..................... | G09G 3/3275 |

FOREIGN PATENT DOCUMENTS

| | | |
|---|---|---|
| CN | 106504706 | 3/2017 |
| TW | 202326682 | 7/2023 |

* cited by examiner

*Primary Examiner* — Van N Chow
(74) *Attorney, Agent, or Firm* — JCIPRNET

(57) ABSTRACT

An electronic device including a first driving circuit, a processor, and a data driver is disclosed. The first driving circuit is configured to receive a first driving signal and generates a sensing signal. The data driver is coupled to the first driving circuit and the processor. An operation period of the electronic device includes a first detection phase and a compensation phase. The compensation phase is after the first detection phase. During the first detection phase, the data driver provides the first driving signal to the first driving circuit and receives the sensing signal from the first driving circuit. Based on the sensing signal, the processor calculates a first compensation value corresponding to the first driving circuit. In the compensation phase, the data driver generates a second driving signal based on the first compensation value and provides the second driving signal to the first driving circuit.

18 Claims, 8 Drawing Sheets

ELECTRONIC DEVICE

CROSS-REFERENCE TO RELATED APPLICATION

This application claims the priority benefit of China application serial no. 202311656450.1, filed on Dec. 5, 2023. The entirety of the above-mentioned patent application is hereby incorporated by reference herein and made a part of this specification.

BACKGROUND

Technical Field

This disclosure relates to an electronic device with a compensation function.

Description of Related Art

Light Emitting Diode (LED) can be used for backlighting or directly as displays, but the entire LED array is susceptible to a variety of factors that can degrade the overall brightness uniformity. For example, differences in the threshold voltage of the transistor elements in the pixel circuit, differences in the chromaticity of the LED, differences in the voltage drop (IR drop), or the carrier mobility of the transistor elements may make the overall brightness of the display uneven. Currently, sub-millimeter LEDs are compensated using internal circuitry, but there are still many problems with this approach. For example, for the overall circuit, there is no way to know which pixel circuit has an anomalous LED; for individual pixel circuits, only the threshold voltage of the transistor element can be compensated and the range of compensation is limited; and the complexity of the compensation circuit is prone to differences due to process factors.

SUMMARY

According to an embodiment of the disclosure, an electronic device includes a first driving circuit, a processor, and a data driver. The first driving circuit is configured to receive a first driving signal and generate a sensing signal. The data driver is coupled to the first driving circuit and the processor. An operation period of the electronic device includes a first detection phase and a compensation phase. The compensation phase is after the first detection phase. In the first detection phase, the data driver provides the first driving signal to the first driving circuit and receives the sensing signal from the first driving circuit. The processor calculates a first compensation value corresponding to the first driving circuit based on the sensing signal. In the compensation phase, the data driver generates a second driving signal based on the first compensation value and provides the second driving signal to the first driving circuit.

According to an embodiment of the disclosure, an electronic device includes a substrate, multiple electronic elements, multiple driving circuits, multiple scan lines, and a data driver. The electronic elements are disposed on the substrate and arranged in an array. The driving circuit is installed on the substrate and corresponding to the electronic elements. One of the driving circuits is configured to receive a driving signal to drive one of the electronic elements and generate a sensing signal. The scan lines are disposed on the substrate and coupled to the driving circuit. The scan lines are configured to provide multiple scan signals to the driving circuit. The data driver is coupled to one of the driving circuits. The data driver is configured to provide a driving signal and receive a sensing signal. The array includes N rows, and a number of the scan lines is N+1.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate example embodiments of the disclosure and, together with the description, serve to explain the principles of the disclosure.

DESCRIPTION OF THE EMBODIMENTS

Figure 1:
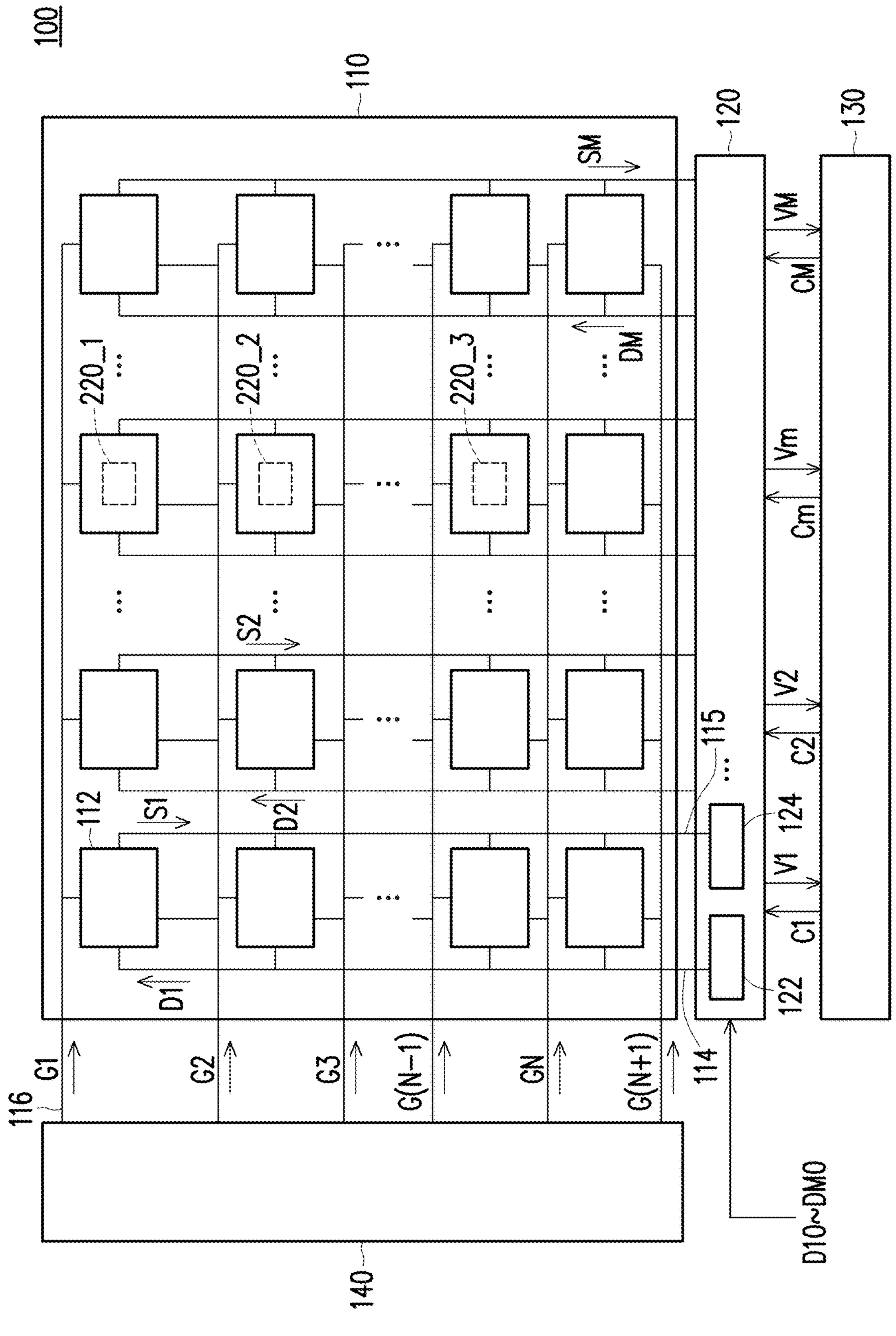
FIG. 1 shows a schematic diagram of an electronic device according to an embodiment of the disclosure.

The disclosure can be understood by referring to the following detailed description in conjunction with the accompanying drawings. It should be noted that, in order to make it easy for the reader to understand and for the simplicity of the drawings, many of the drawings in the disclosure only depict a part of the electronic device. And certain elements in the drawings are not drawn to actual scale. In addition, the number and size of each element in the figures are only for illustration and are not intended to limit the scope of the disclosure.

In the following description and claims, the words "include" and "comprise" are open-ended words, and therefore they should be interpreted to mean "includes but is not limited to . . . ".

It should be understood that although the terms first, second, third . . . can be used to describe various constituent elements, the constituent elements are not limited to these terms. These terms are only used to distinguish a single component from other components in the specification. The same terms may not be used in the claims, but may be replaced by first, second, third . . . according to the order in which the elements are declared in the claims. Therefore, in the following description, the first component may be the second component in the claims.

In some embodiments of the disclosure, terms related to joining and connecting, such as "connected", "interconnected", etc., unless otherwise defined, may mean that two structures are in direct contact, or may also mean that two structures are not in direct contact, there are other structures located between these two structures. And the terms about joining and connecting can also include the situation where both structures are movable, or both structures are fixed. In addition, the term "coupling" includes any direct and indirect means of electrical connection. In the case of direct electrical connection, the end points of the elements on two circuits are directly connected or connected to each other with a conductor line segment. In the case of indirect electrical connection, there is a switch, diode, capacitor, inductor, resistor, other suitable element, or a combination of the foregoing, between the end points of the elements on the two circuits, but are not limited thereto.

An electronic device of the disclosure may include a display device, an antenna device, a sensing device, a light emitting device, or a splicing device, but is not limited thereto. The electronic device may include a bendable or flexible electronic device. The electronic device may include an electronic element. The electronic device includes, for example, a liquid crystal layer or a light emitting diode (LED). The electronic element can include a passive element and an active element, such as a capacitor, resistor, inductor, variable capacitor, filter, diode, transistor, sensor, microelectromechanical systems (MEMS), liquid crystal chip, controller, etc., but not limited thereto. The Diode may include a light emitting diode or photodiode. The light emitting diode may include, for example, organic light emitting diode (OLED), sub-millimeter light emitting diode (mini-LED), micro light emitting diode (micro-LED), quantum dot LED, fluorescence, phosphor, or other suitable material, or a combination of the above, but not limited thereto. The sensor may include, for example, a capacitive sensor, optical sensor, electromagnetic sensor, fingerprint sensor (FPS), touch sensor, antenna, or pen sensor, etc., but not limited thereto. The controller may include, for example, a timing controller, but is not limited thereto. In the following, the disclosure is illustrated by using a display device as an electronic device, but the disclosure is not limited thereto.

Reference will now be made in detail to the exemplary embodiments of the disclosure, examples of which are illustrated in the accompanying drawings. Whenever possible, the same reference numbers are used in the drawings and descriptions to refer to the same or similar parts.

Figure 2:
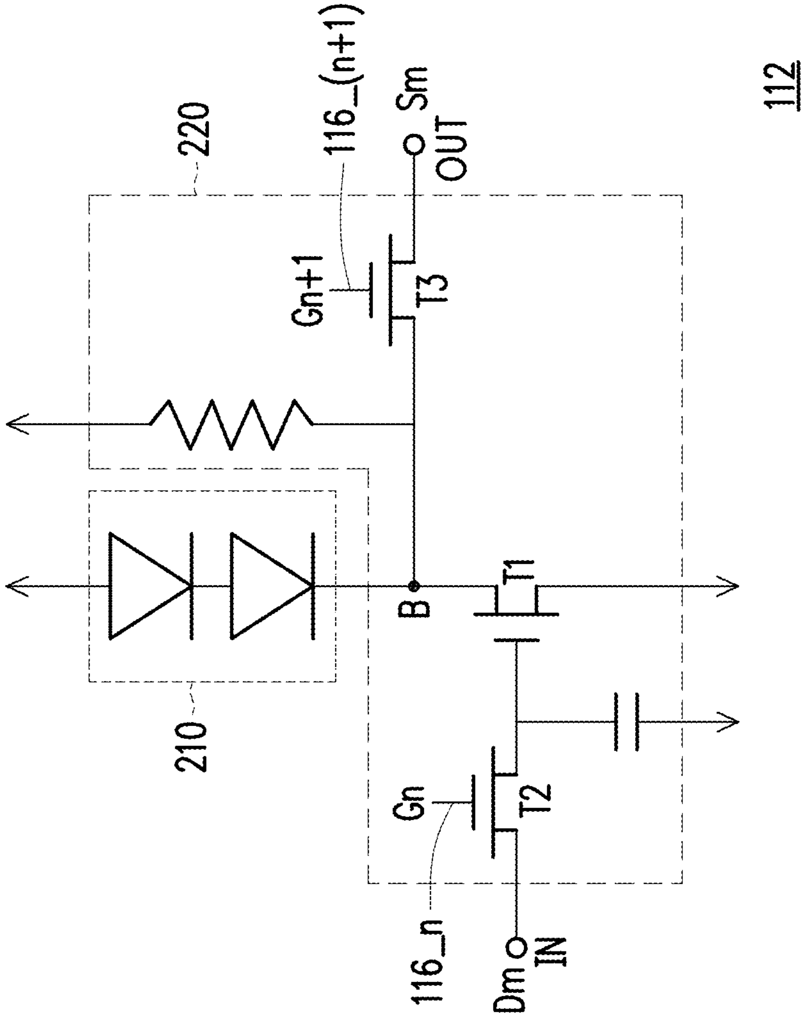
FIG. 2 shows a schematic diagram of a pixel circuit according to the embodiment of FIG. 1.

FIG. 1 shows a schematic diagram of an electronic device according to an embodiment of the disclosure. FIG. 2 shows a schematic diagram of a pixel circuit according to the embodiment of FIG. 1. Referring to FIG. 1 and FIG. 2, an electronic device 100 includes a substrate 110, a data driver 120, a processor 130, and a scan driver 140. The data driver 120 is coupled between the substrate 110 and the processor 130. The electronic device 100 further includes multiple pixel circuits 112, multiple data lines 114, and multiple scan lines 116. It should be noted that although the data driver 120, the processor 130, and the scan driver 140 are disposed outside the substrate 110 in FIG. 1, FIG. 1 is only an example. In some embodiments, the data driver 120, processor 130, and/or the scan driver 140 may be disposed on the substrate 110.

The pixel circuits 112 are disposed on the substrate 110 and arranged in an array. The array includes N rows and M columns, and a number of the scan lines 116 is N+1, where N and M are integers greater than 1. The pixel circuit 112 may be a pixel that emits multiple colors of light at the same time, or a sub-pixel that emits a single color of light. The pixel circuit 112 includes an electronic element 210 and a driving circuit 220. The electronic element 210 is disposed on the substrate 110 and arranged in an array. The electronic element 210 may include multiple light emitting elements or a single light emitting element. In FIG. 2, two light emitting elements coupled in series are used as an illustration, but the disclosure is not limited thereto. The driving circuit 220 is disposed on the substrate 110 and corresponds to the electronic element 210. The scan lines 116 are disposed on the substrate 110 and coupled to the driving circuit 220.

In FIG. 2, taking the driving circuit 220 located at the $n^{th}$ row and the $m^{th}$ column as an example, the driving circuit 220 receives multiple driving signals Dm at a receiving end IN. The driving signal Dm can be used to drive the electronic element 210 and/or generate multiple sensing signals Sm at an output end OUT, where n is an integer greater than 0 and less than or equal to N, and m is an integer greater than 0 and less than or equal to M. A scan line 116_*n* is coupled to the driving circuit 220 and used to provide a scan signal Gn to a control end of a transistor element T2 of the driving circuit 220. A scan line 116_(*n*+1) is coupled to the driving circuit 220 and used to provide a scan signal Gn+1 to a control end of a transistor element T3 of the driving circuit 220. The data driver 120 is used to provide multiple driving signals Dm and receive multiple sensing signals Sm. It should be noted that in some embodiments of the disclosure, the number of the scan lines is one more than the number of rows of the pixel circuits. This is because for the driving circuit 220 of the $N^{th}$ row, the scan signal GN+1 is provided to the control end of the transistor element T3 of the driving circuit 220 through the scan line 116_(N+1) to control the output of a sensing signal Sm.

The data driver 120 is coupled to the driving circuit 220 and the processor 130. The data driver 120 receives original data signals D10 to DM0, that is, uncompensated data signals. In FIG. 1, the data driver 120 provides a driving signal D1 to the pixel circuit 112 in the first column, and receives a sensing signal S1 from the pixel circuit 112 in the first column; the data driver 120 provides a driving signal D2 to the pixel circuit 112 in the second column, and receives a sensing signal S2 from the pixel circuit 112 in the second column, and so on; the data driver 120 provides a driving signal DM to the pixel circuit 112 of the $M^{th}$ column, and receives a sensing signal SM from the pixel circuit 112 of the $M^{th}$ column.

The data driver 120 includes multiple output circuits 122 and multiple sensing circuits 124. An output circuit 122 is used to output the driving signals D1 to DM to a data line 114. The driving signals D1 to DM may be, for example, but not limited to, compensated data signals. The output circuit 122 may include a digital-to-analog converter for converting digital data into analog driving signals D1 to DM, but is not limited thereto. The sensing circuit 124 is coupled to a sensing line 115 for transmitting the sensing signals S1 to SM, and is used to receive the sensing signals S1 to SM. The sensing circuit 124 may include an analog-to-digital converter, which may be used (but is not limited to) to convert the sensing signals S1 to SM into digital signals, and output conversion values V1, V2 to VM to the processor 130.

The processor 130 receives the conversion values V1 to VM, calculates and outputs the compensation values C1 to CM to the data driver 120 accordingly. In addition, the processor 130 can also determine whether the electronic element 210 in the pixel circuit 112 is anomalous. For example, the processor 130 can determine whether a brightness of the electronic element 210 deviates too much from the overall brightness uniformity of the substrate 110 based on the conversion values V1 to VM, such as being too bright or too dark, and is therefore determined to be an anomalous element.

Figure 3:
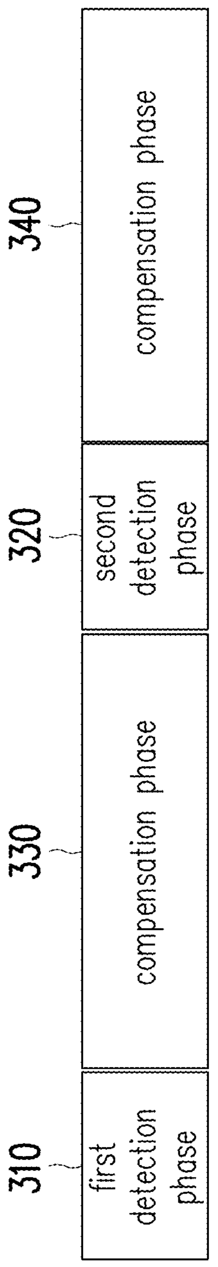
FIG. 3 shows a schematic diagram of an operation period of the electronic device according to the embodiment of FIG. 1.

FIG. 3 shows a schematic diagram of an operation period of the electronic device according to the embodiment of FIG. 1. Referring to FIG. 1 and FIG. 3, an operation period of the electronic device 100 includes a first detection phase 310, a second detection phase 320, and compensation phases 330 and 340. The compensation phase 330 is after the first detection phase 310 and between the first detection phase 310 and the second detection phase 320. Each phase may include multiple frame times. The first detection phase 310 is, for example, initial detection when the electronic device 100 is powered on. The second detection phase 320 is, for example, timing detection after the electronic device 100 has been operated for a period of time. The compensation phases 330 and 340 are, for example, display periods of the electronic device 100.

Figure 4:
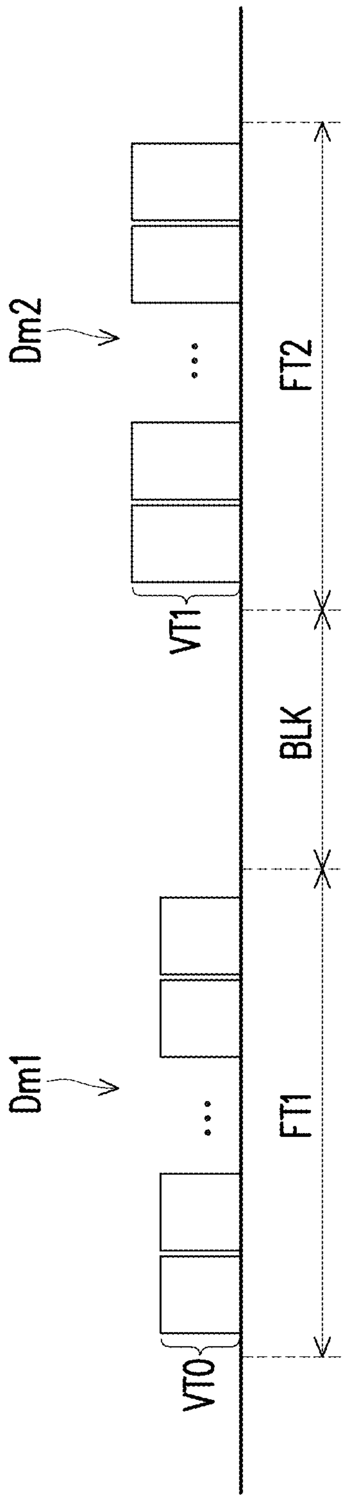
FIG. 4 shows a schematic diagram of a driving signal provided by the electronic device in a detection phase according to the embodiment of FIG. 1.

FIG. 4 shows a schematic diagram of a driving signal provided by the electronic device in a detection phase according to the embodiment of FIG. 1. Referring to FIG. 1, FIG. 2, and FIG. 4, the driving signals D1 to DM provided by the data driver 120 in the detection phases 310 and 320 may be used for detection (hereinafter referred to as a first driving signal). Taking the $m^{th}$ column as an example, in the first detection phase 310, the data driver 120 provides a first driving signal Dm to each driving circuit 220 on the $m^{th}$ column (that is, DM=Dm), and receives sensing signal Sm from the each driving circuit 220 in sequence. The processor 130 calculates the compensation value Cm corresponding to the each driving circuit 220 based on the sensing signal Sm.

Specifically, the first detection phase 310 includes multiple frame times FT1 and FT2. At the frame time FT1, the scan driver 140 sequentially provides scan signals G1, G2, G3 to GN, G(N+1) through the scan lines 116 to the each driving circuit 220 on the $m^{th}$ column, and turns on the transistor element T2 therein. Next, at the frame time FT1, the data driver 120 provides a first driving signal Dm1 with a voltage value VT0, and sequentially drives a transistor element T1 of the each driving circuit 220. Moreover, taking the driving circuit 220 of the $n^{th}$ row shown in FIG. 2 as an example, when the scan signal Gn+1 turns on the transistor element T3, a voltage of a node B (i.e., an end voltage of the electronic element 210) can be read out as the sensing signal Sm. Then, the sensing circuit 124 may convert the sensing signal Sm into a conversion value Vm, and output the conversion value Vm to the processor 130. Thus, the processor 130 may calculate the compensation value Cm of the each driving circuit 220 on the $m^{th}$ column based on the conversion value Vm.

At the frame time FT2, the detection method is similar to the frame time FT1, except that the data driver 120 provides a first driving signal Dm2 with a voltage value VT1 to drive the each driving circuit 220 on the $m^{th}$ column, where the voltage value VT1 is greater than the voltage value VT0. That is, in this embodiment, the voltage values VT0 and VT1 of the first driving signals Dm1 and Dm2 may gradually increase with different frame times FT1 and FT2, but the disclosure is not limited thereto. In some embodiments, the voltage values VT0 and VT1 of the first driving signals Dm1 and Dm2 may gradually decrease with different frame times FT1 and FT2. In addition, a blank period BLK may be included between two adjacent frame times FT1 and FT2, but for the sake of simplicity, it is not shown in FIG. 8 mentioned later.

Figure 5A:
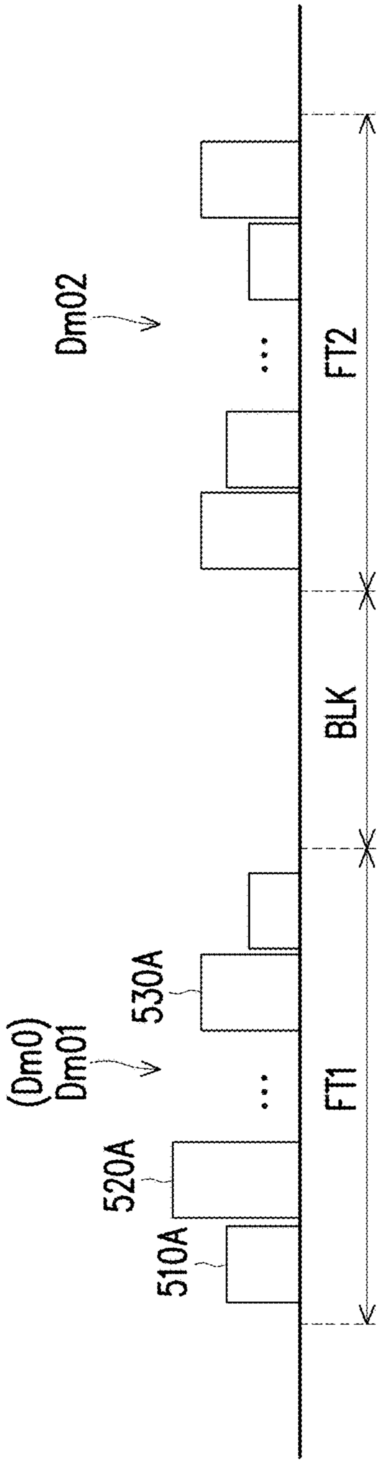
FIG. 5A shows a schematic diagram of an original data signal received by a data driver in a compensation phase according to the embodiment of FIG. 1.
Figure 5B:
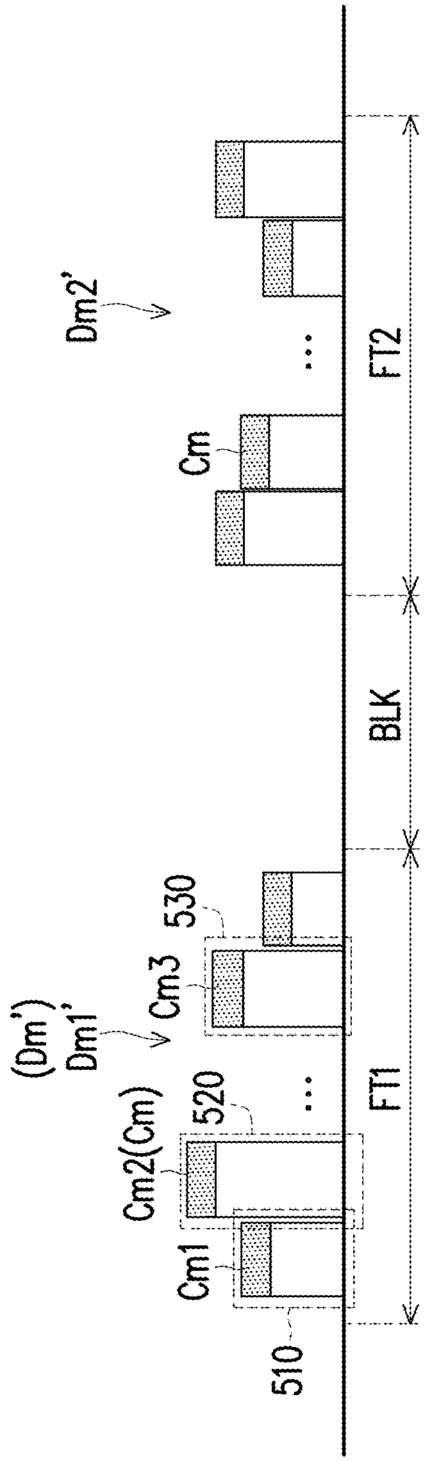
FIG. 5B shows a schematic diagram of a driving signal provided by the electronic device in the compensation phase according to the embodiment of FIG. 1.

FIG. 5A shows a schematic diagram of an original data signal received by a data driver in a compensation phase according to the embodiment of FIG. 1. FIG. 5B shows a schematic diagram of a driving signal provided by the electronic device in the compensation phase according to the embodiment of FIG. 1. Referring to FIG. 1, FIG. 5A, and FIG. 5B, the driving signals D1 to DM provided by the data driver 120 in the compensation phases 320 and 340 may be used for display (hereinafter referred to as a second driving signal). Taking the $m^{th}$ column as an example, in the compensation phase 320, the data driver 120 generates a second driving signal Dm' based on an original data signal Dm0 and the compensation value Cm, and provides the second driving signal Dm' to the each driving circuit 220 on the $m^{th}$ column. In other words, DM=Dm' at this time.

Specifically, the compensation phase 320 includes multiple frame times FT1 and FT2. At the frame time FT1, the scan driver 140 sequentially provides scan signals G1, G2, G3 to GN, G(N+1) through the scan lines 116 to the each driving circuit 220 on the $m^{th}$ column, and turns on the transistor element T2 therein. In the frame time FT1, the data driver 120 provides a second driving signal Dm1' and drives the transistor element T1 of the each driving circuit 220 sequentially. At the frame time FT2, the compensation method is similar to the frame time FT1, except that the data driver 120 provides the second driving signal Dm2' to drive the each driving circuit 220 on the $m^{th}$ column.

In this embodiment, the voltage values of the second driving signals Dm1' and Dm2' are equal to voltage values of original data signals Dm01 and Dm02 plus the compensation value Cm obtained in the first detection phase 310. Specifically, the driving circuit 220 on the $m^{th}$ column includes, for example, a first driving circuit 220_1, a second driving circuit 220_2, and a third driving circuit 220_3. In the first detection phase 310, taking the frame time FT1 as an example, the data driver 120 provides the first driving signal Dm to the first driving circuit 220_1, the second driving circuit 220_2, and the third driving circuit 220_3 to obtain a first compensation value Cm1 corresponding to the first driving circuit 220_1, a second compensation value Cm2 corresponding to the second driving circuit 220_2, and a third compensation value Cm3 corresponding to the third driving circuit 220_3. In the compensation phase 320, taking the frame time FT1 as an example, a second driving signal 510 used to drive the first driving circuit 220_1 is equal to a voltage value of a corresponding original data signal 510A in FIG. 5A plus the compensation value Cm1, a second driving signal 520 used to drive the second driving circuit 220_2 is equal to a voltage value of a corresponding original data signal 520A in FIG. 5A plus the compensation value Cm2, and a second driving signal 530 used to drive the third driving circuit 220_3 is equal to a voltage value of a corresponding original data signal 530A in FIG. 5A plus the compensation value Cm3. The second driving signal Dm2' of the frame time FT2 can also be deduced in the same way.

In this embodiment, the first compensation value Cm1, the second compensation value Cm2, and the third compensation value Cm3 are all the same, but this disclosure is not limited thereto. That is, in this embodiment, the compensation value of each driving circuit may be determined according to the characteristic curve of the electronic element, the processor 130 calculates a representative compensation value based on the respective compensation value, and the entire screen is then compensated with this representative value. In other embodiments, the first compensation value Cm1, the second compensation value Cm2, and the third compensation value Cm3 may also be different. Or the first compensation value Cm1 and the second compensation value Cm2 are the same, and the first compensation value Cm1 and the third compensation value Cm3 are different. The disclosure does not limit the relationship between the magnitude of the compensation values of the each driving circuit.

Figure 6:
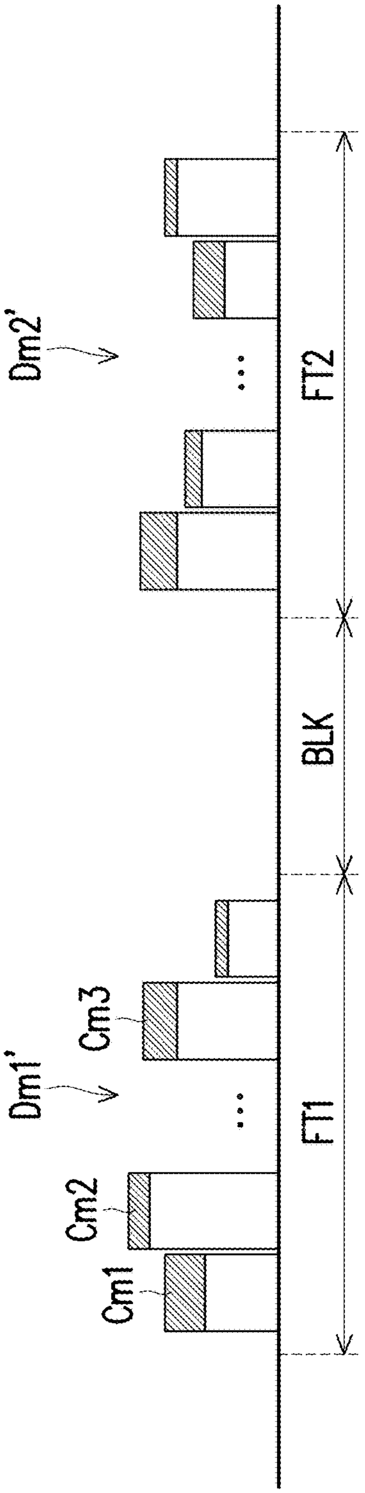
FIG. 6 shows a schematic diagram of a driving signal provided by an electronic device in the compensation phase according to another embodiment of the disclosure.

FIG. 6 shows a schematic diagram of a driving signal provided by an electronic device in the compensation phase according to another embodiment of the disclosure. Referring to FIG. 6, in this embodiment, the first compensation value Cm1, the second compensation value Cm2, and the third compensation value Cm3 are all different. That is, the compensation value of the each driving circuit may be determined according to the characteristic curve of the electronic element, and the data driver 120 compensates accordingly one by one.

Figure 7:
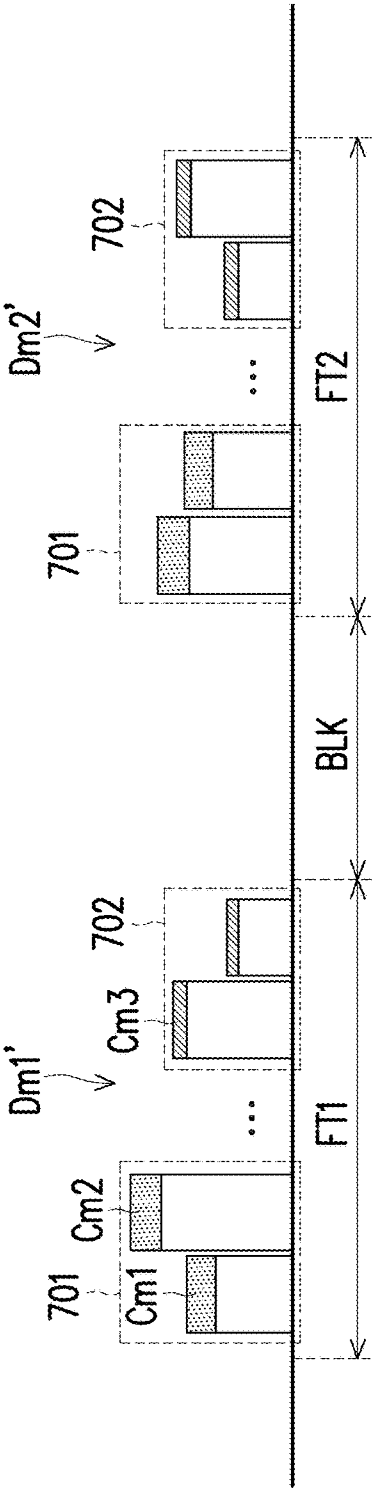
FIG. 7 shows a schematic diagram of a driving signal provided by an electronic device in the compensation phase according to another embodiment of the disclosure.

FIG. 7 shows a schematic diagram of a driving signal provided by an electronic device in the compensation phase according to another embodiment of the disclosure. Referring to FIG. 7, in this embodiment, the first compensation value Cm1 and the second compensation value Cm2 are the same, and the first compensation value Cm1 and the third compensation value Cm3 are different. That is, the compensation value of the each driving circuit may be determined according to the characteristic curve of the electronic element. The processor 130 then partitions the screen, and then calculates compensation values represented by each partition 701, 702 from the respective compensation values, and then the each partition 701, 702 is compensated with the respective representative values. In addition, driving circuits corresponding to pixels of different colors may also have different compensation values.

In the embodiments of FIG. 4 to FIG. 7, the driving circuit 220 on the $m^{th}$ column is used as an example. The detection method and compensation method of the frame time of the driving circuit 220 in other columns on the array at each phase may also be similarly applied. In addition, the first driving circuit 220_1, the second driving circuit 220_2, and the third driving circuit 220_3 are selected from the driving circuits located in different rows in the $m^{th}$ column, but this disclosure is not limited thereto. In other embodiments, the first driving circuit 220_1, the second driving circuit 220_2, and the third driving circuit 220_3 may also be driving circuits in the same row on different columns, or driving circuits in different rows on different columns.

Figure 8:
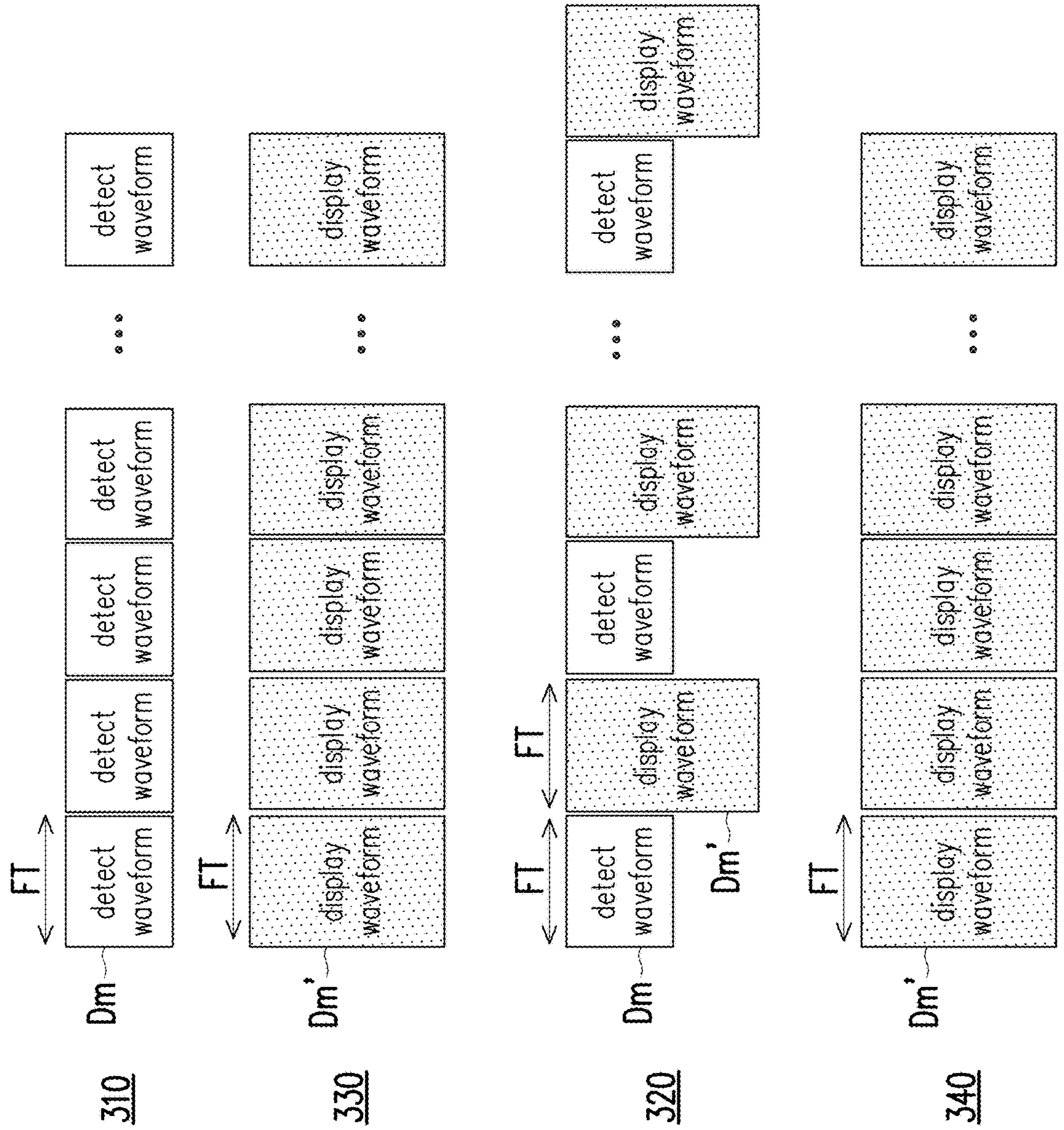
FIG. 8 shows a schematic diagram of the driving signal of the electronic device in different operation periods according to an embodiment of the disclosure.
Figure 9:
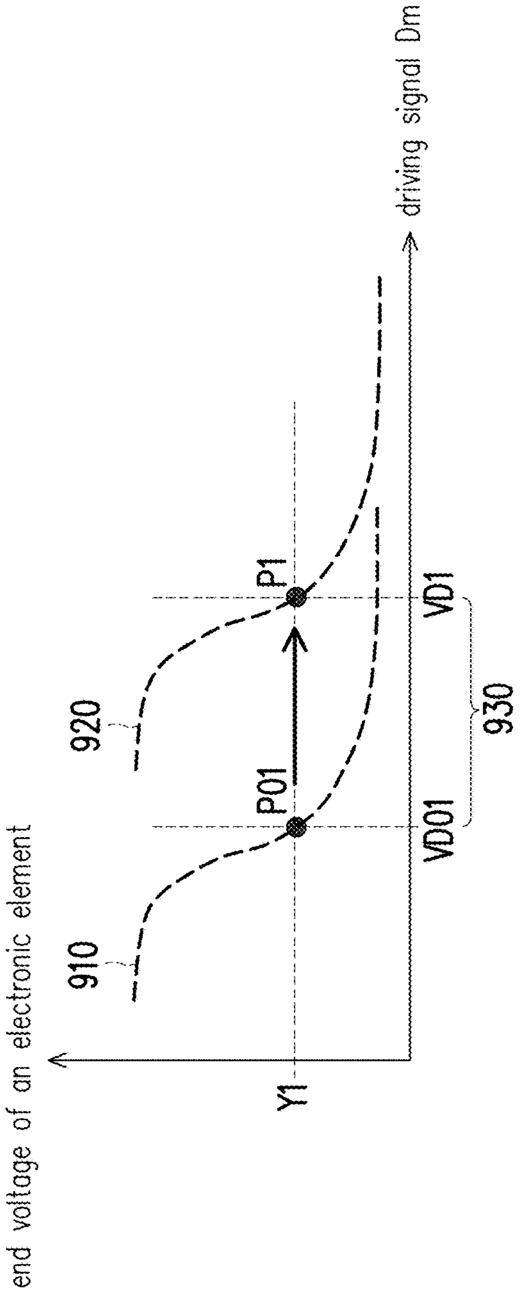
FIG. 9 shows a schematic diagram of a characteristic curve of an electronic element according to an embodiment of the disclosure.

FIG. 8 shows a schematic diagram of the driving signal of the electronic device in different operation periods according to an embodiment of the disclosure. FIG. 9 shows a schematic diagram of a characteristic curve of an electronic element according to an embodiment of the disclosure. Referring to FIG. 1 to FIG. 4, FIG. 8, and FIG. 9, the operation period of the electronic device 100 includes the first detection phase 310, the second detection phase 320, and the compensation phases 330 and 340. Each phase may include multiple frame times FT.

At the time of leaving the factory, each pixel circuit 112 of the electronic device 100 may be measured first to obtain an original characteristic curve 910 of the electronic element 210. For example, the original characteristic curve 910 of each electronic element 210 is obtained when the overall brightness uniformity of the electronic device 100 is 90% or more, but the criteria for obtaining the original characteristic curve in the disclosure are not limited thereto. Then, the first detection phase 310 is a first measurement performed when the device is powered on. As shown in FIG. 4, in the first detection phase 310, at each frame time FT, the data driver 120 provides the first driving signal Dm and obtains the voltage of the node B (i.e., the end voltage of the electronic element 210). As time increases, the voltage value of the first driving signal Dm will gradually change, for example, from the voltage value VT0 to the voltage value VT1. At this time, a second voltage of the same node B may be measured, and then the first driving signal Dm of other voltage values may be input to measure the corresponding voltage value of the same node B. By gradually changing the voltage value of the first driving signal Dm in the first detection phase 310, a measured characteristic curve 920 of the electronic element 210 may be obtained. In this embodiment, the characteristic curves 910 and 920 show the relationship between the end voltage of the electronic element and the driving signal.

Next, the processor 130 may compare the characteristic curves 910 and 920, calculate an offset 930 of the characteristic curve 910, and determine the compensation value Cm. The offset 930 may be calculated by obtaining two signal values VD01 and VD1 on the two curves 910 and 920 corresponding to a same end voltage value Y1, and the difference between the two signal values VD0 and VD1 is the offset 930. In this embodiment, the end voltage value Y1 may correspond to (but is not limited to) turning points P01 and P1 of the characteristic curves 910 and 920. Thus, the offset 930 is the offset of the turning points P01 and P1 of the curves. In an embodiment, the offset may also be determined by an average of offsets of multiple points on the curve. This disclosure places no restrictions on how the offset is calculated.

In addition, the processor 130 may also set a threshold. When the offset exceeds the threshold, the processor 130 determines that the electronic element 210 is anomalous, such as being in an open circuit or short circuit state. At this time, the data driver 120 provides a driving signal corresponding to 0 gray level to the driving circuit 220 corresponding to the anomalous electronic element 210.

After obtaining the offset 930 corresponding to the each driving circuit 220 in the first detection phase 310, the compensation value Cm used in the compensation phase 330 may be determined according to the corresponding method of the embodiment of FIG. 5B, FIG. 6, or FIG. 7. The data driver 120 provides the second driving signal Dm' according to the compensation value Cm determined in the first detection phase 310 to drive the transistor element T1. Since the characteristics of the transistor element may change during the operation period of the electronic device 100, the electronic device 100 may be set to enter the second detection phase 320 after operating for a period of time. In the second detection phase 320, in order to continuously display the image, the data driver 120 may alternately output the first driving signal Dm and the second driving signal Dm' to drive the pixel circuit 112. Thus, in terms of signal timing, the first driving signal Dm and the second driving signal Dm' are interleaved as shown in the second detection phase 320 of FIG. 8. That is, in a part of the frame times FT, the data driver 120 provides the first driving signal Dm, and in another part of the frame times FT, the data driver 120 provides the second driving signal Dm'. It should be noted that during the display period of the second detection phase 320, since a new compensation value Cm has not yet been obtained, the data driver 120 still provides the second driving signal Dm' according to the compensation value Cm determined in the first detection phase 310 to drive the transistor element T1.

Similarly, the compensation value Cm generated after the second detection phase 320 may be determined according to the corresponding method of the embodiments of FIG. 5B, FIG. 6, or FIG. 7. In the compensation phase 340, the data driver 120 provides the second driving signal Dm' according to the compensation value Cm in the second detection phase 320 to drive the transistor element T1.

In an embodiment, when the electronic device 100 achieves the preset brightness uniformity in the compensation phase, the electronic device 100 may only detect in the next detection phase without compensating in the next compensation phase. In an embodiment, the electronic device 100 may gradually adjust the driving signal in the frame times FT during the compensation phase, and the adjustment of the compensation value is accomplished gradually over a number of times rather than immediately all at once to minimize the situation where the voltage adjustment of the drive signal is too large and affects the display quality.

Figure 10:
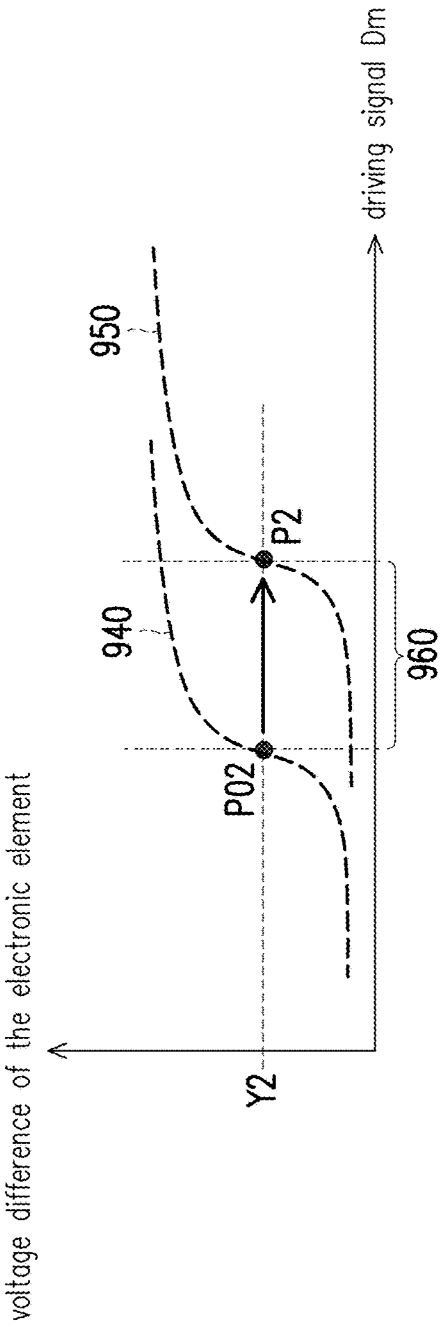
FIG. 10 shows a schematic diagram of a characteristic curve of an electronic element according to another embodiment of the disclosure.

FIG. 10 shows a schematic diagram of a characteristic curve of an electronic element according to another embodiment of the disclosure. Referring to FIG. 10, in this embodiment, characteristic curves 940 and 950 show the relationship between a voltage difference of the electronic element and the driving signal. The voltage difference of the electronic element is, for example, the voltage difference between a system voltage ARVDD and the node B in FIG. 2. Similar to the embodiment shown in FIG. 9, the processor 130 may calculate an offset 960 of the characteristic curve 940 based on (but not limited to) the two curve turning points P02 and P2 corresponding to a same voltage difference Y2 on the characteristic curves 940 and 950 to determine the compensation value Cm, or to determine the compensation value Cm by averaging the offsets of multiple points on the characteristic curves 940 and 950. Since the voltage difference of the electronic element is the voltage difference between the system voltage ARVDD and the node B, an effect of noise may be subtracted, therefore, using the voltage difference of the electronic element to determine the offset reduces the situation in which noise affects the detection results.

Figure 11:
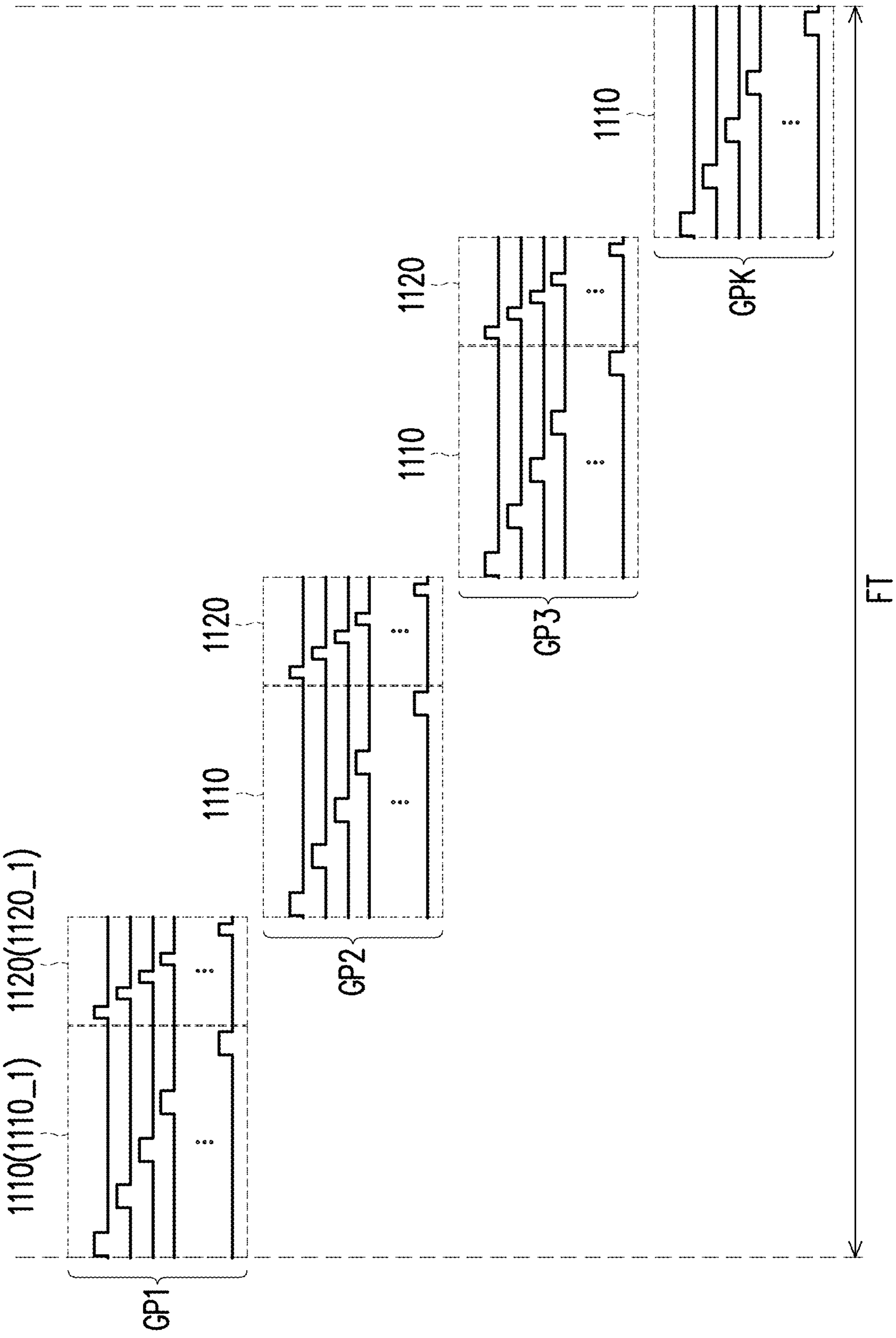
FIG. 11 shows a schematic diagram of detection at one of frame times of the detection phase according to an embodiment of the disclosure.

FIG. 11 shows a schematic diagram of detection at one of frame times of the detection phase according to an embodiment of the disclosure. Referring to FIG. 11, the frame time FT shown in FIG. 11 may be any frame time FT selected from the first detection phase 310 and the second detection phase 320. In this embodiment, the frame time FT is divided into multiple first sections 1110 and multiple second sections 1120. In time, one of the second sections 1120 is between two adjacent ones of the first section 1110. In the second section 1120, the data driver 120 provides the first driving signal to the driving circuit 220 for testing purposes. In the first section 1110, the data driver 120 provides the second driving signal to the driving circuit 220 for display purposes.

Specifically, taking the each driving circuit 220 on the $m^{th}$ column as an example, the scan lines 116 may be divided into multiple scan line groups. A scan signal GP1 is the scan signal GP1 used to scan a first scan line group, and scan signals GP2, GP3, and GPK are scan signals used to scan a second scan line group, a third scan line group, and a Kth scan line group, where K is an integer greater than 3. Taking the first scan line group as an example, in a first section 1110_1, the scan signal GP1 sequentially scans the scan lines, and the data driver 120 provides the second driving signal Dm' to the driving circuit 220 for display purposes. Then, in a second section 1120_1, the data driver 120 provides the first driving signal Dm to the driving circuit 220 for testing purposes. In a second section 1110_2, a corresponding driving circuit 220 outputs the sensing signal Sm to the data driver 120. The detection methods of other scan line groups may be deduced in the same way. In this way, the scan driver 140 may complete scanning by grouping in less than the frame time FT required in the previous embodiment, and the data driver 120 and the processor 130 may complete the detection operation and compensation operation.

It should be noted that although a waveform corresponding to the last scanning group GPK in FIG. 11 does not have the second section 1120, in some embodiments, the waveform corresponding to the last scanning group GPK may have the second section 1120 present, and at this time, the entire frame time FT also includes the second section 1120 corresponding to the scanning group GPK. In addition, for the same driving circuit 220, the second driving signal Dm' only be received once within one frame time FT, but the first driving signal Dm may be received once or more than once. When multiple first driving signals are received, the voltage value of the first driving signal Dm received by the driving circuit 220 tends to increase or decrease gradually.

In this embodiment, in order to minimize the user's perception of a delay due to detection, a frame time may be divided into multiple sections by a multitasker circuit during any of the detection phases. Detection is performed after each part of the scanning line is turned on. If detection is performed in this manner, since a new compensation value has not yet been decided upon, the compensation is still displayed in the current state, such as using the original data signal or using the old compensation value.

To sum up, in the embodiments of the disclosure, the operation period of the electronic device includes a detection phase and a compensation phase. In each detection phase, the processor calculates the compensation value, so that in the next compensation phase, the data driver compensates the driving circuit based on the compensation value. In this way, the overall brightness uniformity of the electronic device may be improved. In addition, in the detection phase, in order to continuously display the screen, the data driver may alternately output the driving signal for detection and the driving signal for display to drive the driving circuit.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. An electronic device, comprising:

a first driving circuit, configured to receive a plurality of first driving signals and generate a plurality of sensing signals;

a processor; and a data driver, coupled to the first driving circuit and the processor, and receiving an original data signal;

wherein an operation period of the electronic device comprises a first detection phase and a compensation phase, and the compensation phase is after the first detection phase;

wherein in the first detection phase, the data driver provides the first driving signals to the first driving circuit, and receives the sensing signals from the first driving circuit, the processor calculates a first compensation value corresponding to the first driving circuit based on the sensing signals, and in the compensation phase, the data driver generates a second driving signal based on the original data signal and the first compensation value, and provides the second driving signal to the first driving circuit, wherein the first detection phase comprises a plurality of frame times, and voltage values of the first driving signals gradually increase with different frame times.

2. The electronic device according to claim 1, wherein a voltage value of the second driving signal is equal to a voltage value of the original data signal plus a first compensation value.

3. The electronic device according to claim 1, wherein the electronic device further comprises a second driving circuit and a third driving circuit, and the data driver provides the first driving signals to the second driving circuit and the third driving circuit in the first detection phase to obtain a second compensation value corresponding to the second driving circuit and a third compensation value corresponding to the third driving circuit.

4. The electronic device according to claim 3, wherein the first compensation value, the second compensation value, and the third compensation value are all different.

5. The electronic device according to claim 3, wherein the first compensation value, the second compensation value, and the third compensation value are all the same.

6. The electronic device according to claim 3, wherein the first compensation value is the same as the second compensation value, and the first compensation value is different from the third compensation value.

7. The electronic device according to claim 1, wherein the operation period of the electronic device further comprises a second detection phase, and the compensation phase is between the first detection phase and the second detection phase, wherein the second detection phase comprises a plurality of frame times, and in a part of the frame times, the data driver provides the first driving signals, and in another part of the frame times, the data driver provides the second driving signal.

8. The electronic device according to claim 1, wherein the operation period of the electronic device further comprises a second detection phase, and the compensation phase is between the first detection phase and the second detection phase, wherein the second detection phase comprises a plurality of frame times, and one of the frame times is divided into a plurality of first sections and a plurality of second sections, in one of the first sections, the data driver provides the second driving signal to the first driving circuit, in one of the second sections, the data driver provides the first driving signal to the first driving circuit, and the one of the second sections is between adjacent two of the first sections.

9. An electronic device, comprising:

a substrate;

a plurality of electronic elements, disposed on the substrate and arranged in an array;

a plurality of driving circuits, disposed on the substrate and corresponding to the electronic elements, wherein one of the driving circuits is configured to receive a plurality of first driving signals and generate a plurality of sensing signals;

a plurality of scan lines, disposed on the substrate and coupled to the driving circuits, wherein the scan lines are configured to provide a plurality of scan signals to the driving circuits; and a data driver, coupled to the driving circuits, wherein the data driver is configured to provide the first driving signals to the one of the driving circuits and receive the sensing signals;

wherein the array comprises N rows, and a number of the scan lines is N+1, wherein an operation period of the electronic device comprises a first detection phase, the first detection phase comprises a plurality of frame times, and voltage values of the first driving signals gradually increase with different frame times.

10. The electronic device according to claim 9 further comprising a processor, and the driving circuits comprising a first driving circuit, wherein the operation period of the electronic device further comprises a compensation phase, and the compensation phase is after the first detection phase;

wherein in the first detection phase, the data driver provides the first driving signals to the first driving circuit, and receives the sensing signals from the first driving circuit, the processor calculates a first compensation value corresponding to the first driving circuit based on the sensing signals, and in the compensation phase, the data driver generates a second driving signal based on the original data signal and the first compensation value, and provides the second driving signal to the first driving circuit and the first compensation value, and provides the second driving signal to the first driving circuit.

11. The electronic device according to claim 10, wherein a voltage value of the second driving signal is equal to a voltage value of the original data signal plus a first compensation value.

12. The electronic device according to claim 10, wherein the driving circuits further comprises a second driving circuit and a third driving circuit, and the data driver provides the first driving signals to the second driving circuit and the third driving circuit in the first detection phase to obtain a second compensation value corresponding to the second driving circuit and a third compensation value corresponding to the third driving circuit.

13. The electronic device according to claim 12, wherein the first compensation value, the second compensation value, and the third compensation value are all different.

14. The electronic device according to claim 12, wherein the first compensation value, the second compensation value, and the third compensation value are all the same.

15. The electronic device according to claim 12, wherein the first compensation value is the same as the second compensation value, and the first compensation value is different from the third compensation value.

16. The electronic device according to claim 10, wherein the operation period of the electronic device further comprises a second detection phase, and the compensation phase is between the first detection phase and the second detection phase.

17. The electronic device according to claim 16, wherein the second detection phase comprises a plurality of frame times, and in a part of the frame times, the data driver provides the first driving signals, and in another part of the frame times, the data driver provides the second driving signal.

18. The electronic device according to claim 10, wherein the operation period of the electronic device further comprises a second detection phase, and the compensation phase is between the first detection phase and the second detection phase, wherein the second detection phase comprises a plurality of frame times, and one of the frame times is divided into a plurality of first sections and a plurality of second sections, in one of the first sections, the data driver provides the second driving signal to the first driving circuit, in one of the second sections, the data driver provides the first driving signal to the first driving circuit, and the one of the second sections is between adjacent two of the first sections.

* * * * *